United States Patent
Lewis et al.

(10) Patent No.: US 10,364,937 B2
(45) Date of Patent: Jul. 30, 2019

(54) TWO-PIECE STAND-PIPE

(71) Applicant: GM Global Technology Operations LLC, Detroit, MI (US)

(72) Inventors: Fred D. Lewis, Ann Arbor, MI (US); Robert Seungmo/S Lee, Walled Lake, MI (US); Christopher B. Preston, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 366 days.

(21) Appl. No.: 15/358,591

(22) Filed: Nov. 22, 2016

(65) Prior Publication Data

US 2018/0142836 A1    May 24, 2018

(51) Int. Cl.
*F16N 19/00* (2006.01)
*F16H 57/04* (2010.01)

(52) U.S. Cl.
CPC ....... *F16N 19/003* (2013.01); *F16H 57/0408* (2013.01); *F16N 2250/18* (2013.01); *F16N 2270/18* (2013.01)

(58) Field of Classification Search
CPC .............. F16N 19/003; F16N 2250/18; F16N 2270/18; F16H 57/0408
USPC ......... 116/28 R, 227–229, 276; 33/346, 365, 33/366.15, 366.17, 366.18, 721–722, 33/728–732
See application file for complete search history.

(56) References Cited

U.S. PATENT DOCUMENTS

| | | | | |
|---|---|---|---|---|
| 1,436,913 A | * | 11/1922 | Seaholm | F16H 57/02 184/11.1 |
| 1,548,773 A | * | 8/1925 | Ziebarth | F16F 9/48 188/287 |
| 1,879,371 A | * | 9/1932 | McCloskey | B61C 17/02 105/236 |
| 2,573,258 A | * | 10/1951 | Gerritsen | F16H 15/20 476/2 |
| 2,660,058 A | * | 11/1953 | Vogt | G01F 23/04 33/717 |
| 4,335,606 A | * | 6/1982 | Michalak | G01F 23/0046 33/721 |
| 5,247,813 A | * | 9/1993 | Bottum | F25B 43/006 116/276 |
| 5,347,817 A | * | 9/1994 | Kim | F25B 43/006 62/471 |
| 6,135,140 A | * | 10/2000 | Grandinetti | E03F 1/00 137/362 |

(Continued)

*Primary Examiner* — Justin Seo
*Assistant Examiner* — Tania C Courson

(57) ABSTRACT

An automobile transmission hydraulic oil fill system includes a transmission oil pan and a two-piece standpipe system. The two-piece stand-pipe system includes a clinch nut connected to the oil pan and having a threaded bore opening through the oil pan. A stand-pipe is fixed to the clinch nut. The stand-pipe includes a longitudinal bore in fluid communication with the threaded bore. An end cap defining a free end of the stand-pipe prevents entrance of hydraulic oil into the longitudinal bore of the stand-pipe during hydraulic oil fill of the transmission. Multiple ports created in a side wall of the stand-pipe allow entrance of the hydraulic oil into the longitudinal bore and to flow out of the threaded bore of the clinch nut. Each of the ports include an edge. The edges of the ports define a hydraulic oil fill level of the transmission.

20 Claims, 4 Drawing Sheets

(56) References Cited

U.S. PATENT DOCUMENTS

| | | | |
|---|---|---|---|
| 7,001,125 B2* | 2/2006 | Wojciechowski | F16B 33/004 |
| | | | 411/180 |
| 7,325,653 B2 | 2/2008 | Gunderson et al. | |
| 7,963,377 B2* | 6/2011 | Quinn | B60G 11/15 |
| | | | 188/315 |
| 8,966,738 B2* | 3/2015 | Staley | F16B 5/0233 |
| | | | 29/525.02 |
| 9,169,748 B2* | 10/2015 | Van Fossan | F01M 5/00 |
| 9,458,759 B2 | 10/2016 | Rollinger et al. | |
| 2005/0166858 A1* | 8/2005 | Lari | A01K 63/003 |
| | | | 119/269 |
| 2007/0227963 A1* | 10/2007 | Fick | B01D 29/21 |
| | | | 210/433.1 |

* cited by examiner

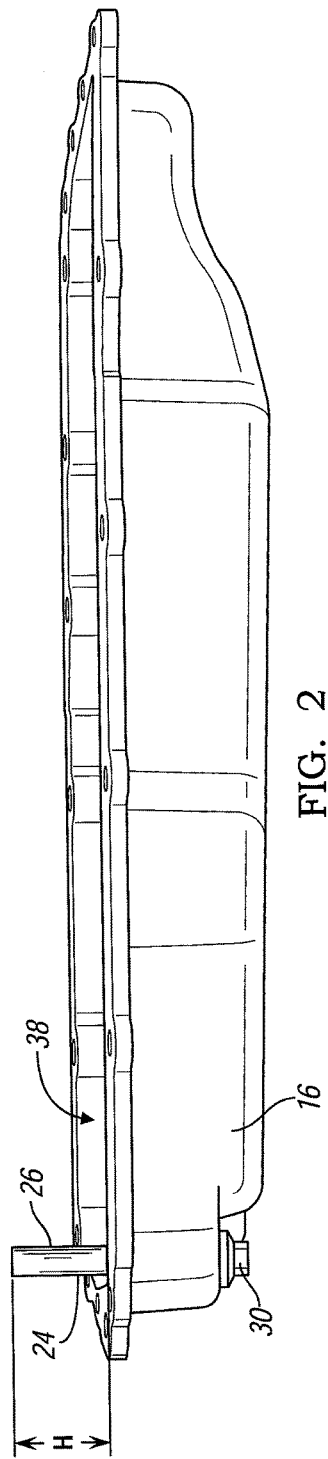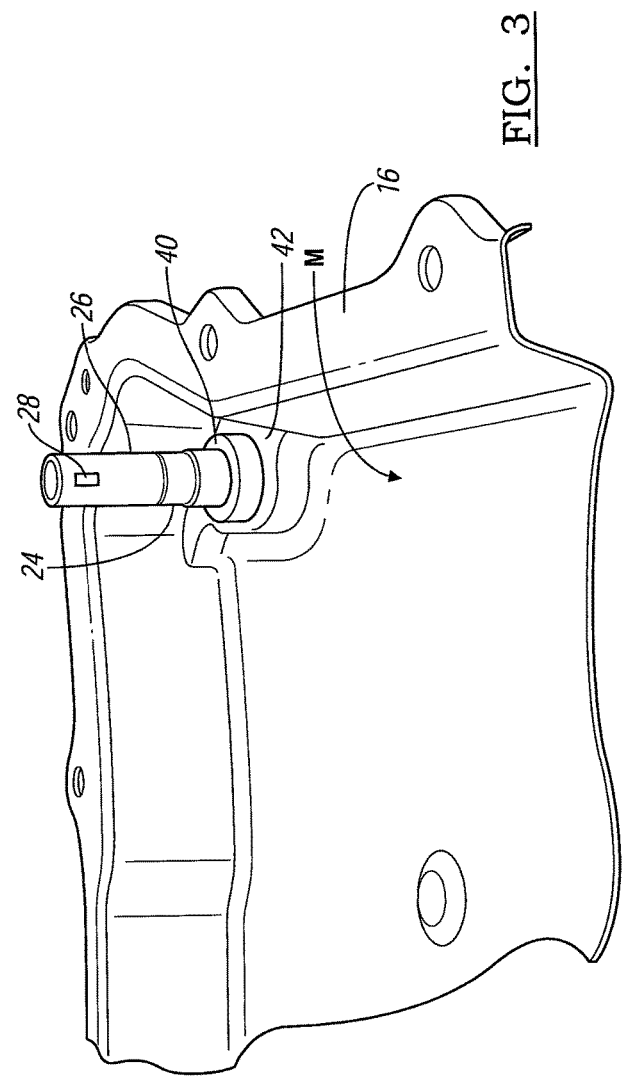

TWO-PIECE STAND-PIPE

INTRODUCTION

The present disclosure relates to stand-pipe assemblies used in automobile transmission oil pans to provide indication of an oil level during oil fill or refill.

In order to fill a predetermined volume of hydraulic oil into an automobile transmission, it is known to use a stand-pipe system having a vertically configured standpipe fixed to a transmission oil pan. Such stand-pipes are open at a top end and a height of the stand-pipe is intended to set a fill level of hydraulic oil in the transmission. During fill, when hydraulic oil reaches the top of the stand-pipe it overflows into a longitudinal bore of the standpipe which opens out through a lower end out of the oil pan. The visual indication of hydraulic oil draining out of the stand-pipe is used as confirmation that the desired fill level has been achieved. During hydraulic oil fill, however, oil traversing the internal components of the transmission may flow downward directly into the stand-pipe, providing visual discharge before the desired fill level has been achieved. In this event a false fill indication is provided and therefore an insufficient volume of hydraulic oil is present in the transmission. Known stand-pipe designs are also one-piece units, with a fixed length that may only be used in a single transmission design.

Thus, while current stand-pipe designs achieve their intended purpose, there is a need for a new and improved device for determining oil level of a transmission during oil fill.

SUMMARY

According to several aspects, a two-piece standpipe system includes a clinch nut having a bore. A stand-pipe is connected to the clinch nut. The stand-pipe includes an end cap defining a free end of the stand-pipe preventing entrance of a fluid into a longitudinal bore of the stand-pipe. At least one port is created in a side wall of the stand-pipe permitting the fluid to enter the longitudinal bore of the stand-pipe and flow into the bore of the clinch nut.

In an additional aspect of the present disclosure, the clinch nut is a metal and the stand-pipe is a polymeric material.

In another aspect of the present disclosure, the clinch nut includes an inner surface having a circular groove.

According to several aspects, the stand-pipe includes a key created during a molding operation of the stand-pipe into the clinch nut, the key extending into the circular groove acting to prevent release of the stand-pipe from the clinch nut.

According to several aspects, the at least one port includes at least two ports each including an edge located at a common distance from the clinch nut.

According to several aspects, the at least one port defines a rectangular shape.

According to several aspects, the end cap is integrally connected to the stand-pipe during a molding operation to create the stand-pipe.

According to several aspects, the clinch nut includes a threaded bore oppositely positioned from the end cap.

According to several aspects, a plug having a threaded shank is threadably engaged with the threaded bore of the clinch nut to releasably seal the longitudinal bore.

According to several aspects, the stand-pipe is frictionally received against an inner cylindrical wall of the clinch nut.

According to several aspects, a collar is integrally connected to the stand-pipe.

According to several aspects, the collar has a diameter greater than a diameter of the stand-pipe.

According to several aspects, the collar includes a conical section joined to the stand-pipe.

According to several aspects, the collar is connected during a separate molding operation to the clinch nut.

In another aspect of the present disclosure, a two-piece standpipe system includes a clinch nut having a threaded bore. A stand-pipe is connected to the clinch nut. The stand-pipe includes a longitudinal bore in fluid communication with the threaded bore. An end cap defining a free end of the stand-pipe prevents entrance of a fluid into the longitudinal bore of the stand-pipe. At least two ports are created in a side wall of the stand-pipe allowing entrance of the fluid into the longitudinal bore and to flow into the threaded bore of the clinch nut. Each of the ports includes an edge located at a common distance from the clinch nut.

According to several aspects, the stand-pipe is frictionally received against an inner cylindrical wall of the clinch nut.

According to several aspects, the stand-pipe is a polymeric material molded into the clinch nut and directly contacts against an inner cylindrical wall of the clinch nut.

According to several aspects, the clinch nut includes an extending portion which provides positive frictional engagement between the clinch nut and an oil pan where the extending portion extends through an aperture created in the oil pan.

According to several aspects, the edge of each of the ports defines an oil fill level of a transmission to which the oil pan is connected.

According to further aspects, an automobile transmission hydraulic oil fill system includes a transmission oil pan and a two-piece standpipe system. The two-piece stand-pipe system includes a clinch nut connected to the oil pan and having a threaded bore opening through the oil pan. A stand-pipe is fixed to the clinch nut. The stand-pipe includes a longitudinal bore in fluid communication with the threaded bore. An end cap defining a free end of the stand-pipe prevents entrance of hydraulic oil into the longitudinal bore of the stand-pipe during hydraulic oil fill of the transmission. Multiple ports created in a side wall of the stand-pipe allow entrance of the hydraulic oil into the longitudinal bore and to flow out of the threaded bore of the clinch nut. Each of the ports include an edge. The edges of the ports define a hydraulic oil fill level of the transmission.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a left perspective side elevational view of an oil pan according to an exemplary embodiment;

FIG. 3 is a top perspective view of the oil pan of FIG. 2 according to an exemplary embodiment;

DETAILED DESCRIPTION

The following description is merely exemplary in nature and is not intended to limit the present disclosure, application, or uses.

Figure 1:
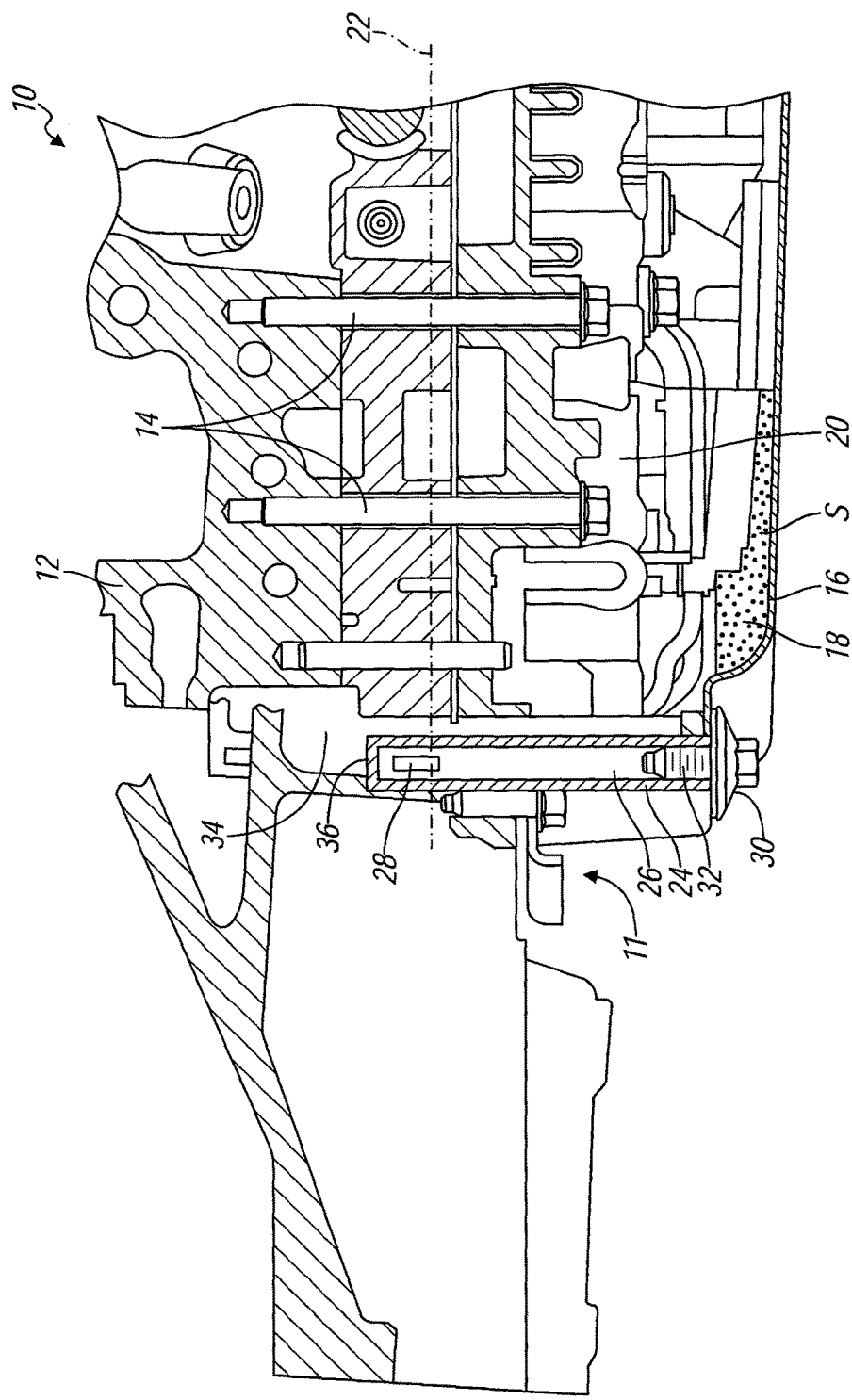
FIG. 1 is a cross sectional side elevational view of an automobile transmission oil pan having a two-piece stand-pipe according to an exemplary embodiment.

Referring to FIG. 1, a two-piece stand-pipe system 10 according to several aspects is provided for an automobile transmission hydraulic oil fill system 11 of an automatic transmission 12 of an automobile for use during hydraulic oil fill of the transmission 12. The transmission 12 can include control valves 14 positioned in a valve body used for example for controlling clutches and brakes of the automatic transmission 12. An oil pan 16 connected to the transmission 12 defines a sump area "S" acting as the transmission low point for collection of transmission hydraulic oil 18. During fill of transmission hydraulic oil 18, multiple cavities 20 are filled and the hydraulic oil 18 also traverses downward over multiple rotating components, gearsets, and the like into the sump "S" until the hydraulic oil 18 reaches a desired fill level 22. To set the fill level 22 and to ensure the fill level 22 is achieved, a two-piece stand-pipe assembly 24 is provided. The two-piece stand-pipe assembly 24 includes a substantially vertically oriented stand-pipe 26 having at least one and according to several aspects multiple side-wall positioned ports 28 proximate to an upper end of the stand-pipe 26. A plug 30 provides a threaded shank 32 which is releasably threaded into a lower end of the stand-pipe 26 during normal transmission operation, but is removed during the hydraulic oil fill operation.

To ensure that hydraulic oil 18 reaches the desired fill level 22, the plug 30 is removed during the fill operation. Hydraulic oil 18 fill flow is continued until a visible indication of hydraulic oil 18 exiting from the lower open end of the stand-pipe 26 is identified. With the plug 30 removed, hydraulic oil 18 visually dripping or flowing from the open two-piece stand-pipe assembly 24 provides assurance the desired fill level 22 has been achieved. During the fill operation, hydraulic oil 18 fills the oil pan 16 and the multiple cavities 20 until reaching the elevation of the ports 28. When multiple ports 28 are provided, they are arranged about a perimeter of the stand-pipe 26 at equal heights above the plug 30. The quantity and size of the ports 28 can vary to achieve unrestricted flow of hydraulic oil 18 into the stand-pipe 26.

In order to prevent hydraulic oil 18 which is downwardly flowing through a region 34 proximate to the two-piece stand-pipe assembly 24 from directly dropping into the stand-pipe 26 and giving a false indication that the desired fill level 22 has been reached, a closed end cap 36 is provided defining an upper end of the stand-pipe 26. The provision of the closed end cap 36 permits oil flow into the stand-pipe 26 only through the one or more horizontally open ports 28. Hydraulic oil 18 moving in a downward direction during the fill operation is therefore prevented from directly entering the stand-pipe 26. Because the ports 28 are prepositioned in the stand-pipe 26 at the known or desired fill level 22, when oil discharge is observed out of the lower end of the two-piece stand-pipe assembly 24 the desired fill level 22 is assured. At this time the plug 30 is refastened to the two-piece stand-pipe assembly 24.

Referring to FIG. 2 and again to FIG. 1, the two-piece stand-pipe assembly 24 is shown in an exemplary installed position in the oil pan 16. At least a portion of the stand-pipe 26 extends above a plane defined by an upper lip or flange face 38 of the oil pan 16. A height "H" of the portion of the stand-pipe 26 which extends above the flange face 38 is predetermined based on the specific geometry of the transmission 12 and a desired volume of hydraulic oil in the transmission 12. According to several aspects the two-piece stand-pipe assembly 24 is preinstalled in the oil pan 16 prior to installation of the oil pan 16 onto the transmission 12.

Referring to FIG. 3 and again to FIG. 2, in an exemplary installation the stand-pipe assembly 24 includes a clinch nut 40 which frictionally engages with a surface 42 of the oil pan 16. In the exemplary aspect shown, the stand-pipe assembly 24 is positioned on the surface 42 which is raised above a bottom or main face "M" of the oil pan 16. The surface 42 provides a rigid installation location for the stand-pipe assembly 24 and secures the stand-pipe assembly 24 against rotation or movement which could impact components of the transmission 12.

Figure 4:
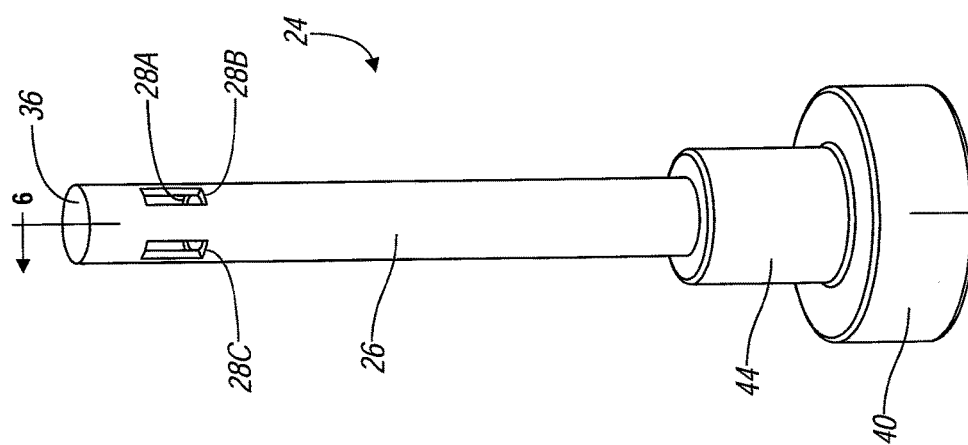
FIG. 4 is a front elevational perspective view of a two-piece stand-pipe according to an exemplary embodiment.

Referring to FIG. 4, a sleeve 44 having a smaller diameter than the clinch nut 40 is integrally connected to the clinch nut 40, which reduces overall component weight while providing for insertion and retention of the stand-pipe 26. According to several aspects, the stand-pipe assembly 24 is provided having the clinch nut 40 and the sleeve 44 provided as a cast, forged or molded part assembly, having the clinch nut 40 and the sleeve 44 formed in a first operation and the stand-pipe 26 either inserted into the sleeve 44, or molded in a second molding operation which couples the stand-pipe 26 to the sleeve 44.

According to further aspects, the clinch nut 40 and the sleeve 44 can both be formed of a metal such as aluminum in a casting or forging operation, with the stand-pipe 26 inserted in a second operation. As previously noted the quantity of ports 28 can vary. According to several aspects, three ports 28a, 28b, 28c are provided, each equidistantly separated from the other two. The quantity of ports 28 can also be one, two, or more than three. If the stand-pipe 26 is formed of a polymeric material using a molding operation, the end cap 36 can be co-molded during molding of the stand-pipe 26. According to further aspects, the end cap 36 can be provided as a separate piece which is fixed to the stand-pipe 26, for example by a friction fit, the use of threads, an adhesive, or the like.

Figure 5:
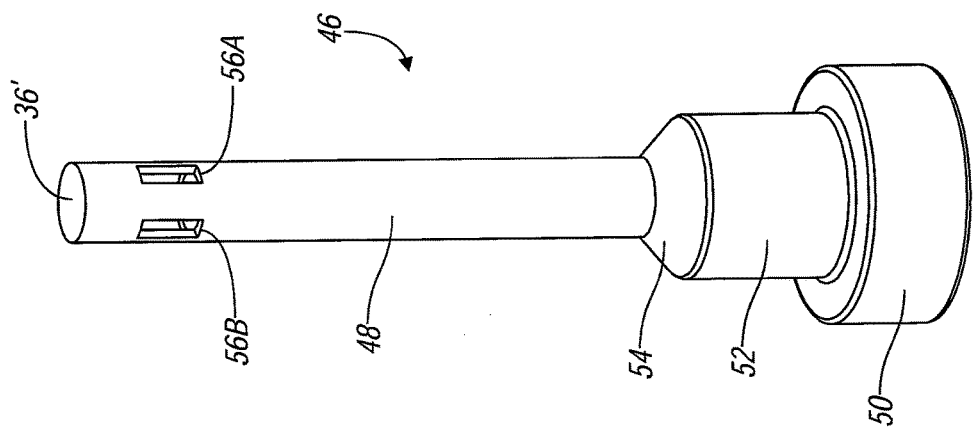
FIG. 5 is a front elevational perspective view of a two-piece stand-pipe according to another exemplary embodiment.

Referring to FIG. 5 and again to FIG. 4, a stand-pipe assembly 46 is modified from the stand-pipe assembly 24. The stand-pipe assembly 46 includes a stand-pipe 48 which is homogeneously and therefore integrally connected to a collar 52. The collar 52 can have a diameter greater than a diameter of the stand-pipe 48 and is joined to the stand-pipe 48 using a conical section 54. The collar 52 is connected, for example during a separate molding operation to a clinch nut 50 which can be made of a polymeric material, a composite material, or a metal. In at least one and according to several aspects multiple ports 56a, 56b are provided at a common distance from the clinch nut 50. The ports 56a, 56b, similar to the ports 28 can have any desired geometric shape, such as rectangular as shown, however, they can also be circular, oval, square, or have any geometric shape desired. An end cap 36' is provided to seal a free end of the stand-pipe 48, and is substantially the same in design and function as the end cap 36, and therefore requires no further discussion.

Referring to FIG. 6 and again to FIGS. 1 and 4, the stand-pipe assembly 24 is provided in two pieces, having the stand-pipe 26 formed in a first operation, and the clinch nut 40 formed in a second operation. This permits a common clinch nut 40 to be used in multiple different embodiments having different lengths of the stand-pipe 26, such that the stand-pipe 26 that is selected can be optimized to suit different transmission designs having different hydraulic oil volumes and therefore having different hydraulic oil desired fill levels 22.

The stand-pipe assembly 24 can be provided with an outer circular face 58 of the stand-pipe 26 molded into direct contact with an inner cylindrical wall 60 of the sleeve 44. To further lock the stand-pipe 26 to the sleeve 44, a circular groove 62 can be provided for example by a machining operation in the sleeve 44. During the subsequent molding operation of the stand-pipe 26, material of the stand-pipe 26 flows into the groove 62 creating a key 64 integrally connected to the stand-pipe 26 and filing the groove 62, and thereby providing a positive lock to prevent the stand-pipe 26 from pulling out of the sleeve 44. The key 64 further provides a seal between the stand-pipe 26 and the sleeve 44 as a tortuous path to prevent oil leakage via the stand-pipe to sleeve connection.

The clinch nut 40 further includes an extending portion 66 which provides positive frictional engagement between the clinch nut 40 and the oil pan 16 where the extending portion 66 extends through an aperture created in the oil pan 16. An internally threaded bore 68 extending through the clinch nut 40 provides for threaded engagement of the threaded shank 32 of the plug 30 described in reference to FIG. 1. An extending length "A" of the stand-pipe 26 measured from an end face 70 of the sleeve 44 can be varied as previously discussed herein to provide different stand-pipe lengths for use in different transmission designs.

Figure 6:
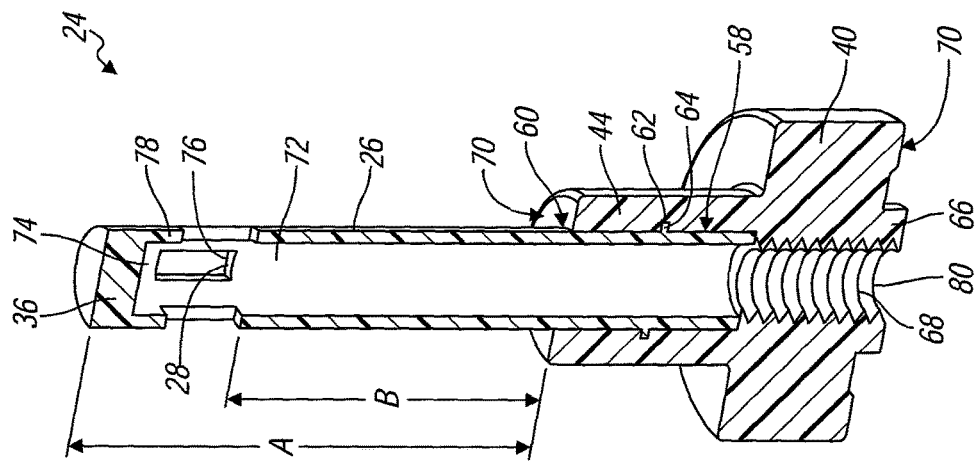
FIG. 6 is cross sectional side elevational view taken at section 6 of FIG. 4.

The stand-pipe 26 includes a longitudinal bore 72 sealed at an upwardly directed free end 74 of the stand-pipe 26 by the end cap 36. The longitudinal bore 72 communicates with the threaded bore 68. The one or more ports 28 open directly into the longitudinal bore 72 and each include a lower edge 76. A predetermined distance "B" of the lowermost portion or the lower edge 76 of each port 28 from the end face 70 predetermines the fill level 22 of the transmission. The one or more ports 28 are each created through a side wall 78 of the stand-pipe 26 such that hydraulic oil 18 entering any of the one or more ports 28 flows downwardly through the longitudinal threaded bore 68, through the threaded bore 68 (open when the plug 30 is removed as shown in FIG. 6), and out via an open end 80 of the stand-pipe assembly 24.

An automobile transmission hydraulic oil fill system 11 includes a transmission oil pan 16. A two-piece standpipe system 10 includes a clinch nut 40 connected to the oil pan 16 and having a threaded bore 68 opening through the oil pan 16. A stand-pipe 26 is fixed to the clinch nut 40. The stand-pipe 26 includes a longitudinal bore 72 in fluid communication with the threaded bore 68. An end cap 36 defines a free end 74 of the stand-pipe 26 preventing entrance of a hydraulic oil 18 into the longitudinal bore 72 of the stand-pipe 26 during hydraulic oil fill of the transmission 12. Multiple ports 28 created in a side wall 78 of the stand-pipe 26 allow entrance of the hydraulic oil 18 into the longitudinal bore 72 and to flow out of the threaded bore 68 of the clinch nut 40. Each of the ports includes an edge 76. The edges 76 of the ports 28 are each located at the same elevation and define a hydraulic oil fill level 22 of the transmission 12.

A two-piece stand-pipe system 10 of the present disclosure offers several advantages. These include the use of a closed-end stand-pipe to prevent oil from entering the stand-pipe from directly above the stand-pipe, which could result as the hydraulic oil flows downwardly through the transmission during fill. The side wall position of the one or more ports of the stand-pipe determines the fill level of hydraulic oil in the transmission, while allowing for unrestricted overflow of hydraulic oil during fill to be visible to the installer.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A two-piece standpipe system, comprising:
   a clinch nut having a sleeve connected to the clinch nut and a bore extending through the clinch nut and the sleeve; and
   a stand-pipe having an outer face of the stand-pipe directly connected to an inner wall of the sleeve of the clinch nut, the stand-pipe including;
      an end cap defining a free end of the stand-pipe preventing entrance of a fluid into a longitudinal bore of the stand-pipe; and
      at least one port created in a side wall of the stand-pipe permitting the fluid to enter the longitudinal bore of the stand-pipe and flow into the bore of the clinch nut and the sleeve.

2. The two-piece standpipe system of claim 1, wherein the clinch nut is a metal and the stand-pipe is a polymeric material.

3. The two-piece standpipe system of claim 2, wherein the clinch nut includes an inner surface having a circular groove.

4. The two-piece standpipe system of claim 3, wherein the stand-pipe includes a key created during a molding operation of the stand-pipe into the clinch nut, the key extending into the circular groove acting to prevent release of the stand-pipe from the clinch nut.

5. The two-piece standpipe system of claim 1, wherein the at least one port includes at least two ports each including an edge with the edge of all of the ports located at a common distance from the clinch nut.

6. The two-piece standpipe system of claim 1, wherein the at least one port defines a rectangular shape.

7. The two-piece standpipe system of claim 1, wherein the end cap is integrally connected to the stand-pipe during a molding operation to create the stand-pipe.

8. The two-piece standpipe system of claim 1, wherein the clinch nut includes a threaded bore oppositely positioned from the end cap.

9. The two-piece standpipe system of claim 8, further including a plug having a threaded shank threadably engaged with the threaded bore of the clinch nut to releasably seal the longitudinal bore.

10. The two-piece standpipe system of claim 1, wherein the stand-pipe is frictionally received against an inner cylindrical wall of the clinch nut.

11. The two-piece standpipe system of claim 1, further including a collar integrally connected to the stand-pipe.

12. The two-piece standpipe system of claim 11, wherein the collar has a diameter greater than a diameter of the stand-pipe.

13. The two-piece standpipe system of claim 11, wherein the collar includes a conical section joined to the stand-pipe.

14. The two-piece standpipe system of claim 11, wherein the collar is connected during a separate molding operation to the clinch nut.

15. A two-piece standpipe system, comprising:
a clinch nut having a sleeve connected to the clinch nut and a threaded bore extending through the clinch nut and the sleeve; and
a stand-pipe having an outer face of the stand-pipe directly connected to an inner wall of the sleeve of the clinch nut, the stand-pipe including:
a longitudinal bore in fluid communication with the threaded bore;
an end cap defining a free end of the stand-pipe preventing entrance of a fluid into the longitudinal bore of the stand-pipe; and
at least two ports created in a side wall of the stand-pipe allowing entrance of the fluid into the longitudinal bore and to flow into the threaded bore of the clinch nut, each of the ports including a lower edge located at a single predetermined distance from an end face of the clinch nut.

16. The two-piece standpipe system of claim 15, wherein the stand-pipe is frictionally received against an inner cylindrical wall of the clinch nut.

17. The two-piece standpipe system of claim 15, wherein the stand-pipe is a polymeric material molded into the clinch nut and directly contacts against an inner cylindrical wall of the clinch nut.

18. The two-piece standpipe system of claim 15, wherein the clinch nut includes an extending portion which provides positive frictional engagement between the clinch nut and an oil pan where the extending portion extends through an aperture created in the oil pan.

19. The two-piece standpipe system of claim 18, wherein the edge of each of the ports defines an oil fill level of a transmission to which the oil pan is connected.

20. An automobile transmission hydraulic oil fill system, comprising:
a transmission oil pan;
a two-piece standpipe system, including:
a clinch nut having a sleeve connected to the clinch nut and a bore extending through the clinch nut and the sleeve, the clinch nut connected to the oil pan and having a threaded bore opening into the bore of the clinch nut and through the oil pan; and
a stand-pipe fixed to the clinch nut, the stand-pipe including:
a longitudinal bore in fluid communication with the threaded bore and with the bore of the clinch nut and the sleeve;
an end cap defining a free end of the stand-pipe preventing entrance of hydraulic oil into the longitudinal bore of the stand-pipe during hydraulic oil fill of the transmission; and
multiple ports created in a side wall of the stand-pipe allowing entrance of the hydraulic oil into the longitudinal bore and to flow out of the threaded bore of the clinch nut, each of the ports including a lower edge located at a single predetermined distance from an end face of the clinch nut;
wherein the edges of the ports define a hydraulic oil fill level of the transmission.

* * * * *